US008730277B2

(12) United States Patent
Ishihara et al.

(10) Patent No.: US 8,730,277 B2
(45) Date of Patent: May 20, 2014

(54) DRIVING DEVICE, DRIVING METHOD, IMAGE DISPLAY DEVICE, TELEVISION RECEIVER, DISPLAY MONITOR DEVICE, PROGRAM AND RECORD MEDIUM

(75) Inventors: Tomoyuki Ishihara, Osaka (JP); Akihiko Inoue, Osaka (JP); Masamitsu Kobayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 274 days.

(21) Appl. No.: 13/319,706

(22) PCT Filed: Feb. 8, 2010

(86) PCT No.: PCT/JP2010/000750

§ 371 (c)(1), (2), (4) Date: Nov. 10, 2011

(87) PCT Pub. No.: WO2010/143330

PCT Pub. Date: Dec. 16, 2010

(65) Prior Publication Data

US 2012/0069062 A1 Mar. 22, 2012

(30) Foreign Application Priority Data

Jun. 10, 2009 (JP) ................................ 2009-139106

(51) Int. Cl.
*G09G 5/10* (2006.01)
*H04N 9/31* (2006.01)

(52) U.S. Cl.
USPC .......................................... 345/690; 348/760

(58) Field of Classification Search
USPC ........................................................ 345/690
See application file for complete search history.

(56) References Cited

U.S. PATENT DOCUMENTS

2008/0211973 A1* 9/2008 Hekstra et al. ................ 348/760
2012/0044281 A1* 2/2012 Kang ............................ 345/690

FOREIGN PATENT DOCUMENTS

JP 2000214829 A 8/2000
JP 2002149129 A 5/2002
JP 2004118047 A 4/2004
JP 2007264211 A 10/2007

* cited by examiner

*Primary Examiner* — Kent Chang
*Assistant Examiner* — Nathan Brittingham
(74) *Attorney, Agent, or Firm* — Harness, Dickey & Pierce

(57) ABSTRACT

A driving device of a embodiment of the invention for driving a pixel array section includes a generation device (weighted average calculation section) for generating pixel values of driving signals of at least one color for pixels of the at least one color among driving signals of colors to be supplied sequentially to the pixel array section, the generation device being configured to generate the pixel values for each pixel of the at least one color on (i) a pixel value of the pixel in a current frame of the color of the pixel and (ii) a pixel value of the pixel in a previous of the same. This makes it possible to create a subframe appropriate in display position and luminance, thereby realizing an image display signal device, driving method, image display device, television receiver, and display monitor device, in which color breaking is effectively alleviated.

18 Claims, 6 Drawing Sheets

FIG. 6

| Input Frame Number | Input Image Signal | | | Output Subframe Number | Subframe Type | Subframe Image Number | | |
|---|---|---|---|---|---|---|---|---|
| | R | G | B | | | R | G | B |
| n-1 | $IR_{n-1}$ =100 | $IG_{n-1}$ =100 | $IB_{n-1}$ =100 | 1 | RB | $SR_{n-1,1}$ $=a_6*IR_{n-2}+a_1*IR_{n-1}$ =14.3 | N/A | $SB_{n-1,1}$ $=a_6*IB_{n-2}+a_1*IB_{n-1}$ =14.3 |
| | | | | 2 | G | N/A | $SG_{n-1,2}$ $=a_5*IG_{n-2}+a_2*IG_{n-1}$ =28.6 | N/A |
| | | | | 3 | RB | $SR_{n-1,3}$ $=a_4*IR_{n-2}+a_3*IR_{n-1}$ =42.9 | N/A | $SB_{n-1,3}$ $=a_4*IB_{n-2}+a_3*IB_{n-1}$ =42.9 |
| | | | | 4 | G | N/A | $SG_{n-1,4}$ $=a_3*IG_{n-2}+a_4*IG_{n-1}$ =57.1 | N/A |
| | | | | 5 | RB | $SR_{n-1,5}$ $=a_2*IR_{n-2}+a_5*IR_{n-1}$ =71.4 | N/A | $SB_{n-1,5}$ $=a_2*IB_{n-2}+a_5*IB_{n-1}$ =71.4 |
| | | | | 6 | G | N/A | $SG_{n-1,6}$ $=a_1*IG_{n-2}+a_6*IG_{n-1}$ =85.7 | N/A |
| | | | | 7 | RB | $SR_{n-1,7}$ $=IR_{n-1}$ =100 | N/A | $SB_{n-1,7}$ $=IB_{n-1}$ =100 |
| n | $IR_n$ =0 | $IG_n$ =0 | $IB_n$ =0 | 1 | G | N/A | $SG_{n,1}$ $=a_6*IG_{n-1}+a_1*IG_n$ =85.7 | N/A |
| | | | | 2 | RB | $SR_{n,2}$ $=a_5*IR_{n-1}+a_2*IR_n$ =71.4 | N/A | $SB_{n,2}$ $=a_5*IB_{n-1}+a_2*IB_n$ =71.4 |
| | | | | 3 | G | N/A | $SG_{n,3}$ $=a_4*IG_{n-1}+a_3*IG_n$ =57.1 | N/A |
| | | | | 4 | RB | $SR_{n,4}$ $=a_3*IR_{n-1}+a_4*IR_n$ =42.9 | N/A | $SB_{n,4}$ $=a_3*IB_{n-1}+a_4*IB_n$ =42.9 |
| | | | | 5 | G | N/A | $SG_{n,5}$ $=a_2*IG_{n-1}+a_5*IG_n$ =28.6 | N/A |
| | | | | 6 | RB | $SR_{n,6}$ $=a_1*IR_{n-1}+a_6*IR_n$ =14.3 | N/A | $SB_{n,6}$ $=a_1*IB_{n-1}+a_6*IB_n$ =14.3 |
| | | | | 7 | G | N/A | $SG_{n,7}$ $=IG_n$ =0 | N/A |

DRIVING DEVICE, DRIVING METHOD, IMAGE DISPLAY DEVICE, TELEVISION RECEIVER, DISPLAY MONITOR DEVICE, PROGRAM AND RECORD MEDIUM

TECHNICAL FIELD

The present invention relates to a driving device and a driving method for driving a pixel array section. The present invention also relates to an image display device including such a driving device.

BACKGROUND ART

Liquid crystal display apparatuses having liquid crystal displays, for example, are widely used as apparatuses for displaying a color video image.

Driving methods for liquid crystal display panels encompass field sequential driving. The field sequential driving refers to a driving method for controlling a liquid crystal display panel so that three subframes which respectively correspond to three primary colors are sequentially displayed in sync with respective lighting timings of backlights which respectively correspond to the three primary colors. The three subframes displayed in a time-division manner are superimposed on a retina of a viewer due to persistence of vision so that the three subframes are recognized by the viewer as one color frame.

FIG. 7 is a block diagram (cited from Patent Literature 1) illustrating an arrangement of a conventional drive circuit for driving a liquid crystal display panel by field sequential driving. The conventional drive circuit has an RGB sync separation circuit 42, an R scan speed conversion circuit 43, a G scan speed conversion circuit 44, a B scan speed conversion circuit 45, a timing control circuit 46, and a backlight drive circuit 47.

An input video signal 41 supplied to the conventional drive circuit is separated by the RGB sync separation circuit 42 into video signals which respectively correspond to the three primary colors, red (R), green (G), and blue (B). The video signals are supplied to the R scan speed conversion circuit 43, the G scan speed conversion circuit 44, and the B scan speed conversion circuit 45, respectively, so that respective scan speeds of the video signals are converted into tripled ones. Then, the video signals subjected to this speed conversion are sequentially supplied to a light valve (liquid crystal display panel) in accordance with signals from the timing control circuit 46. The backlight drive circuit 47 supplies backlight control signals to backlights in accordance with the signals from the timing control circuit 46.

In a liquid crystal display apparatus which does not have color filters but carries out the field sequential driving, each of pixels corresponds to one picture element. That is, the liquid crystal display apparatus which drives its liquid crystal display by the field sequential driving makes it possible to obtain a resolution three times a resolution of a common liquid crystal display apparatus in which each of pixels corresponds to three picture elements. Further, the liquid crystal display apparatus makes it possible to obtain a transmittance three times a transmittance of the common liquid crystal display apparatus. This makes it possible to reduce power consumption for image display operation at a luminance to one-third of that of the common liquid crystal display apparatus to perform the image display operation at the same luminance.

On the other hand, there has been known that the liquid crystal display apparatus utilizing the field sequential driving causes a phenomenon called color breaking. The color breaking is such a phenomenon that in a case where a line of sight of a viewer follows an object moving on a display screen, sequentially-displayed subframes which respectively correspond to the three primary colors are not evenly superimposed on a retina of the viewer so that the viewer recognizes the three primary colors such that a color component corresponding to one of the subframes is emphasized.

The following describes the color breaking, with reference to drawings.

FIG. 2 is a view illustrating how a white object having a uniform luminance moves rightward along a horizontal line in a video image to be displayed on a liquid crystal display.

(a) of FIG. 8 is a schematic view illustrating video signals which are outputted from the RGB sync separation circuit 42 in a case where a video signal indicative of the video image illustrated in FIG. 2 is supplied to the RGB sync separation circuit 42. In (a) of FIG. 8, signs IR, IG, and IB indicate video signals which respectively correspond to red, green, and blue, and the signs have subscripts (n−1, n, and n+1) indicating corresponding frame numbers. A height of each of the video signals IR, IG, and IB indicates a luminance of an image. In this example, the white object has a uniform luminance. Accordingly, the video signals IR, IG, and IB have rectangular shapes having an equal height.

In (a) of FIG. 8, a vertical axis represents a temporal axis, and time progresses downward along the temporal axis. (a) of FIG. 8 shows, perpendicularly to the temporal axis, a rightward coordinate axis corresponding to the horizontal line of FIG. 2. (a) of FIG. 8 shows the video signals IR, IG, and IB along a direction perpendicular to both the temporal axis and the rightward coordinate axis. Note that arrangement of the synchronization input signals along the rightward coordinate axis does not indicate an actual arrangement of the pixels on the display screen illustrated in FIG. 2.

(b) of FIG. 8 is a schematic view illustrating output signals which are supplied from the R scan speed conversion circuit 43, the G scan speed conversion, circuit 44, and the B scan speed conversion circuit 45 to the light valve (liquid crystal display panel) in a case where the video signals IR, IG, and IB in (a) of FIG. 8 are supplied to the R scan speed conversion circuit 43, the G scan speed conversion circuit 44, and the B scan speed conversion circuit 45 on a frame-by-frame basis, respectively. The output signals are referred to as SR, SG, and SB, respectively, and have subscripts (n−1, n, and n+1) indicating that the output signals are those for different frames.

Consider here that a line of sight of a viewer follows an edge P of the white object in FIG. 2. The white object moves rightward along the horizontal line. Accordingly, a point of sight moves on the display screen while following the edge P. This movement corresponds to a downward movement of the point of sight along a dashed line (hereinafter, referred to as follow line Q) in (b) of FIG. 8.

In (b) of FIG. 8, the follow line Q intersects with end points of falls of the output signals SR. On the other hand, the follow line Q does not intersect with end points of falls of the output signals SG and SB. This indicates that the viewer recognizes only a red color at the edge P, and a green color and a blue color are off the point of sight.

Accordingly, the three primary colors cannot be properly superimposed on the retina of the viewer. As a result, the three primary colors are recognized at the edge P such that only red is emphasized. This is a phenomenon called color breaking.

The explanation above deals with a case where the line of sight of the viewer follows the edge of the white object moving on the display screen. However, the color breaking can be caused in case of objects other than the white object, and can also be caused in a position other than an edge of an object.

Patent Literature 1 discloses a liquid crystal display apparatus of a field sequential driving method. The liquid crystal display apparatus divides one frame into two subframes so as to display, in one of the two subframes, a subframe made up of a green component only, and display, in the other of the two subframes, a subframe made up of a red component and a blue component.

In order to realize such a display method, a liquid crystal display panel of the liquid crystal display apparatus has color filters which allow the red component and the green component to pass through, and color filters which allow the blue component and the green component to pass through. According to the liquid crystal display apparatus, it is sufficient to divide each frame into two subframes in total which are a subframe corresponding to green and a subframe corresponding to red and blue, in order to display an image in color. This makes it possible to increase a frame rate of a video image to be displayed on the liquid crystal display, as compared to that liquid crystal display apparatus of a field sequential driving method which requires three subframes. This makes it possible to expect an effect of alleviating the color breaking.

However, a problem still persists in that it is difficult to fundamentally alleviate the color breaking only by increasing a frame rate.

Patent Literature 2 discloses an image processing apparatus having a display position correction circuit which corrects display positions of subframes of each frame by use of a movement detector circuit. The display position correction circuit of the image processing apparatus corrects display positions of subframes so that subframes are evenly superimposed on a retina of a viewer while a line of sight of the viewer follows an object moving a display screen. This makes it possible to suppress color breaking in displaying a moving image.

CITATION LIST

Patent Literatures

Patent Literature 1
Japanese Patent Application Publication, Tokukai, No. 2002-149129 A (Publication Date: May 24, 2002)
Patent Literature 2
Japanese Patent Application Publication, Tokukai, No. 2000-214829 A (Publication Date: Aug. 4, 2000)

SUMMARY OF INVENTION

However, the movement detector circuit in the image processing apparatus requires a very complex calculation for detection of a movement direction and a movement distance of an image. Specifically, the movement detector circuit finds pixel values that drive signals corresponding respectively to colors have, by use of a motion vector found on the basis of data of respective regions of a plurality of frames. Accordingly, the movement detector circuit requires an enormous calculation for each frame. Accordingly, a large-scale LSI and a large-scale memory are required for realizing a high-speed drive circuit. This is a major factor of increase of costs. Further, depending on an image and its movement, a motion vector cannot be found appropriately. This leads to a possibility of imaging failure together with color breaking.

The present invention was made in view of the problems. An object of the present invention is to realize a driving device which makes it possible to effectively suppress color breaking by use of simple calculations.

In order to attain the object, a driving device of the present invention includes generation means for generating pixel values of driving signals of at least one color for pixels of the at least one color among driving signals of a plurality of colors to be supplied sequentially to the pixel array section, the generation means generating the pixel values for each pixel of the at least one color on the basis of (i) a pixel value of the pixel in one of two continuously-inputted frames corresponding to the color of the pixel and (ii) a pixel value of the pixel in other one of the two continuously-inputted frames corresponding to the color of the pixel.

That movement detector circuit for suppressing color breaking which is provided in the image processing apparatus of Patent Literature 1 finds pixel values of drive signals of respective colors from a motion vector found on the basis of data of respective regions of a plurality of frames. Accordingly, the movement detector circuit requires an enormous calculation for each frame. Accordingly, such an image processing apparatus requires a large-scale LSI and a large-scale memory. This is a major factor of increase of costs. Further, depending on an image and its movement, a motion vector cannot be found appropriately. This leads to a possibility of, imaging failure together with color breaking.

The arrangement makes it possible to generate pixel values of driving signals of at least one color for pixels of the at least one color among driving signals of a plurality of colors, specifically, generate the pixel values for each pixel of the at least one color on the basis of (i) a pixel value of the pixel in one of two continuously-inputted frames corresponding to the color of the pixel and (ii) a pixel value of the pixel in other one of the two continuously-inputted frames corresponding to the color of the pixel. Accordingly, less calculation is required for each frame. This allows high-speed processing. Accordingly, by providing the driving device in an image display device, it is possible to effectively suppress color breaking, without a large-scale LSI and a large-scale memory. Further, it is possible to generate values that drive signals corresponding to the plurality of colors have for pixels, without using a motion vector. This makes it possible to prevent imaging failure.

The driving device of the present invention is preferably arranged such that said generation means generates the pixel values of the drive signals of the at least one color for each pixel of the at least one color by obtaining a weighted average of (i) a value of the pixel in an $n^{th}$ input frame corresponding to the color of the pixel and (ii) a value of the pixel in an $(n-1)^{th}$ input frame corresponding to the color of the pixel.

That is, the generation means preferably generates $SR_n$ by the following weighted average calculation: $SR_n=\alpha_1*IR_{n-1}+\alpha_2*IR_n$, where: $SR_n$ represents a value that a drive signal corresponding to red has for a pixel; $IR_n$ represents a value of the pixel in a current input frame corresponding to red; and $IR_{n-1}$ represents a value of the pixel in a previous input frame corresponding to red. In the equation, $\alpha_1$ and $\alpha_2$ are weighting coefficients for the weighted average calculation, and satisfy $\alpha_1+\alpha_2=1$.

The symbol * is an operator indicating multiplication (the same holds for the below).

The generation means makes it possible to generate pixel values of driving signals of at least one color for pixels of the at least one color among driving signals of a plurality of colors, by such a simple weighted average calculation. This makes it possible to perform the pixel-by-pixel calculation at high speed. Accordingly, by providing, in an image display device, the driving device having the generation means, it is possible to effectively suppress color breaking.

The driving device of the present invention is preferably arranged such that: plural colors are generated by said generation means on the basis of the $n^{th}$ input frame and the $(n-1)^{th}$ input frame; and weighing of the driving signals of the plural colors is carried out by using a greater weight for driving signals of one of the plural colors than a weight for drive signals of another one of the plural colors which drive signals of another one of the plural colors are supplied to the pixel array section earlier than the drive signals of the one of the plural colors.

That is, it is preferable that: e.g., the generation means generate $SR_n$ which is a value that a drive signal corresponding to red has for a pixel, by the equation: $SR_n=\alpha_1*IR_{n-1}+\alpha_2*IR_n$, by using $IR_n$ which is a value of the pixel in a current input frame corresponding to red and $IR_{n-1}$ which is a value of the pixel in a previous input frame corresponding to red; the generation means generates $SB_n$ which is a value that a drive signal corresponding to blue has for a pixel, by the equation: $SB_n=\alpha_3+\alpha_4*IB_n$, by using $IB_n$ which is a value of the pixel in the current input frame corresponding to blue and $IB_{n-1}$ which is a value of the pixel in the previous input frame corresponding to blue; and in a case where the drive signal corresponding to red is supplied to a liquid crystal display panel later than the drive signal corresponding to blue, $\alpha_2>\alpha_4$ is satisfied. In the equations, $\alpha_1$, $\alpha_2$, $\alpha_3$, and $\alpha_4$, are weighting coefficients for the weighted average calculations, and satisfy $\alpha_1+\alpha_2=1$ and $\alpha_3+\alpha_4=1$.

The generation means makes it possible to generate a subframe having an appropriate display position and an appropriate luminance, by use of simple calculations which are the weighted average calculations. Further, according to the arrangement, image display is performed in such a manner that a ratio among the color components is controlled in accordance with time progression. This makes it possible to alleviate color breaking which is recognizable for a viewer. Accordingly, by providing the driving device having the generation means in the image display device, it is possible to effectively suppress color breaking.

The driving device of the present invention is preferably arranged such that: among the drive signals of the plurality of colors to be supplied sequentially to the pixel array section, said generation means generates drive signals of a specific color on the basis of an input video signal of an $n^{th}$ input frame which input video signal corresponds to the specific color; and said generation means generates drive signals of each of the rest of the plurality of colors other than the specific color on the basis of (i) an input video signal of the $n^{th}$ input frame which input video signal corresponds to the color and (ii) an input video signal of an $(n-1)^{th}$ input frame which input video signal corresponds to the color.

According to the arrangement, among the drive signals of the plurality of colors to be supplied sequentially to the pixel array section, the generation means generates drive signals of a specific color on the basis of an input video signal of an $n^{th}$ input frame which input video signal corresponds to the specific color, and the generation means generates drive signals of each of the rest of the plurality of colors other than the specific color on the basis of (i) an input video signal of the $n^{th}$ input frame which input video signal corresponds to the color and (ii) an input video signal of an $(n-1)^{th}$ input frame which input video signal corresponds to the color. This makes it possible to prevent deterioration of an image corresponding to the specific color. This makes it possible to alleviate deterioration of a whole image.

The driving device of the present invention is preferably arranged such that the specific color has a highest display luminance among the plurality of colors.

The arrangement makes it possible to prevent deterioration of an image corresponding to a color which is highest in its display luminance among the plurality of colors. This makes it possible to effectively alleviate deterioration of a whole image.

The driving device is preferably arranged such that the specific color is green.

The arrangement makes it possible to prevent deterioration of an image corresponding to green. In image display in the three primary colors of RGB, green is displayed with a highest display luminance in general. Therefore, a viewer has a highest visibility for green. Accordingly, by adopting an arrangement which prevents deterioration of green in particular, it is possible to alleviate deterioration of an whole image.

The driving device of the present invention preferably sequentially supplies, to the pixel array section, (i) drive signals corresponding respectively to the plurality of colors or (ii) a combination of at least two of the driving signals, so as to cause the pixel array section to display "p" types of "q" number of subframes, the drive signals being generated on the basis of an $n^{th}$ input frame and an $(n-1)^{th}$ input frame or on the basis of the $n^{th}$ input frame, wherein "q" is not an integral multiple of "p."

The types of subframes refer to those which are divided by colors in which the subframes are displayed.

For example, four green subframes and three red-blue subframes are alternately displayed on the pixel array section, by sequentially supplying, to the pixel array section, drive signals themselves corresponding to green each of which is generated on the basis of an $n^{th}$ input frame and an $(n-1)^{th}$ input frame or on the basis of the $n^{th}$ input frame; and combinations each made up of two drive signals corresponding respectively to red and blue which two signals are generated on the basis of the $n^{th}$ input frame and the $(n-1)^{th}$ input frame. In this case, two types of seven subframes are displayed in total on the pixel array section.

In other words, the types of subframes in this example are the two types: green subframe and red-blue subframe. In this example, seven subframes are displayed in total. The number of the subframes is not an integral multiple of 2 which is the number of the types of the subframes.

The arrangement makes it possible to prevent only a specific color from being displayed in a last subframe in each frame. That is, in a case where a last subframe in one frame corresponds to green in the example above, a last subframe in a next frame corresponds to red and blue.

This makes it possible to suppress color breaking, with prevention of occurrence thereof on a specific color.

The driving device of the present invention is preferably arranged such that: a combination of drive signals of the plurality of colors are generated on the basis of an $n^{th}$ input frame and an $(n-1)^{th}$ input frame or on the basis of the $n^{th}$ input frame and are supplied in a combination thereof to the pixel array section, so that at least one of subframes displayed by the pixel array section is generated from the combination of drive signals of the plurality of colors.

According to the arrangement, by displaying at least one subframe, an image is displayed which contains a plurality of colors. This makes it possible to increase a frame rate for image display. This makes it possible to suppress color breaking more effectively.

The driving device of the present invention preferably further includes: selection means for selecting, from the drive signals of the plurality of colors generated by said generation, drive signals of the plurality of colors to be supplied to the pixel array section in sync with a timing of lighting of light sources corresponding respectively to the color.

According to the arrangement, the driving device includes selection means for selecting, from the drive signals of the plurality of colors, drive signals of the plurality of colors to be supplied to the pixel array section in sync with a timing of lighting of light sources corresponding respectively to the color. This allows the pixel array section to display, at a sufficient luminance, images which correspond respectively to the plurality of colors.

An image display device of the present invention includes any one of the driving devices; and the pixel array section which the image display device controls by use of the drive signals generated by said driving device.

According to the arrangement, the image display device includes the driving device, and drives the pixel array section by use of the drive signals generated by the driving device. This makes it possible to effectively suppress color breaking, without a large-scale LSI and a large-scale memory.

The image display device of the present invention is preferably arranged such that the pixel array section is a liquid crystal display panel having no color filter.

According to the arrangement, employed is a liquid crystal display panel having no color filter. This makes it possible to drive the liquid crystal display panel, without causing decrease in resolution due to the color filters.

The image display device of the present invention may be arranged such that the pixel array section has a color filter for allowing two color components to pass through.

The arrangement makes it possible to display, at a time, two images having respective two colors. This makes it possible to increase a frame rate for image display. This makes it possible to effectively suppress color breaking.

A television receiver of the present invention includes any one of the image display devices.

According to the arrangement, the television receiver includes the image display device. This makes it possible to effectively suppress color breaking, without a large-scale LSI and a large-scale memory.

A display monitor device of the present invention includes any one of the image display devices.

According to the arrangement, the display monitor device includes the image display device. This makes it possible to effectively suppress color breaking, without a large-scale LSI and a large-scale memory.

A method of the present invention for driving a pixel array section, includes the step of generating pixel values of driving signals of at least one color for pixels of the at least one color among driving signals of a plurality of colors to be supplied sequentially to the pixel array section, the step of generating including the pixel values for each pixel of the at least one color on the basis of (i) a pixel value of the pixel in one of two continuously-inputted frames corresponding to the color of the pixel and (ii) a pixel value of the pixel in other one of the two continuously-inputted frames corresponding to the color of the pixel.

According to the method, pixel values of driving signals of at least one color for pixels of the at least one color among driving signals of a plurality of colors to be supplied sequentially to the pixel array section are generated on the basis of (i) a pixel value of the pixel in one of two continuously-inputted frames corresponding to the color of the pixel and (ii) a pixel value of the pixel in other one of the two continuously-inputted frames corresponding to the color of the pixel. Accordingly, less calculation is required for each frame. This allows high-speed processing. Accordingly, by employing the method, it is possible to effectively suppress color breaking, without a large-scale LSI and a large-scale memory. Further, it is possible to generate values that drive signals corresponding to the plurality of colors have for pixels, without using a motion vector. This makes it possible to prevent imaging failure.

The method of the present invention is preferably arranged such that in said step of generating, the pixel values of the drive signals of the at least one color for each pixel of the at least one color are generated by obtaining a weighted average of (i) a value of the pixel in an $n^{th}$ input frame corresponding to the color of the pixel and (ii) a value of the pixel in an $(n-1)^{th}$ input frame corresponding to the color of the pixel.

The generation step makes it possible to generate pixel values of driving signals of at least one color for pixels of the at least one color among driving signals of a plurality of colors, by the weighted average calculations. This makes it possible to perform the pixel-by-pixel calculation at high speed. Accordingly, by employing the method including the generation step, it is possible to effectively suppress color breaking.

The method of the present invention is preferably arranged such that in the step of generating, plural colors are generated by said generation means on the basis of the $n^{th}$ input frame and the $(n-1)^{th}$ input frame; and weighing of the driving signals of the plural colors is carried out by using a greater weight for driving signals of one of the plural colors than a weight for drive signals of another one of the plural colors which drive signals of another one of the plural colors are supplied to the pixel array section earlier than the drive signals of the one of the plural colors.

The generation step makes it possible to generate a sub-frame having an appropriate display position and an appropriate luminance, by use of simple calculations which are the weighted average calculations. Further, image display is performed in such a manner that a ratio among the color components is thus controlled in accordance with time progression. This makes it possible to alleviate color breaking which is recognizable for a viewer. Accordingly, by employing the method including the generation step, it is possible to effectively suppress color breaking.

The method of the present invention is preferably arranged such that: in the step of generating, among the drive signals of the plurality of colors to be supplied sequentially to the pixel array section, drive signals of a specific color are generated on the basis of an input video signal of an $n^{th}$ input frame which input video signal corresponds to the specific color, whereas drive signals of each of the rest of the plurality of colors other than the specific color are generated on the basis of (i) an input video signal of the $n^{th}$ input frame which input video signal corresponds to the color and (ii) an input video signal of an $(n-1)^{th}$ input frame which input video signal corresponds to the color.

According to the generation step, among the drive signals of the plurality of colors to be supplied sequentially to the pixel array section, drive signals of a specific color are generated on the basis of an input video signal of an $n^{th}$ input frame which input video signal corresponds to the specific color, and drive signals of each of the rest of the plurality of colors other than the specific color are generated on the basis of (i) an input video signal of the $n^{th}$ input frame which input video signal corresponds to the color and (ii) an input video signal of an $(n-1)^{th}$ input frame which input video signal corresponds to the color. This makes it possible to prevent deterioration of an image corresponding to the specific color. This makes it possible to alleviate deterioration of a whole image.

The method of the present invention preferably includes: sequentially supplying, to the pixel array section the drive signals of the plurality of colors by supplying driving signals of one color or by supplying drive signals of a combination of at least two colors, so as to cause the pixel array section to display p types of q number of subframes, the drive signals being generated on the basis of an $n^{th}$ input frame and an $(n-1)^{th}$ input frame or on the basis of the $n^{th}$ input frame, wherein q is not an integral multiple of p.

The types of subframes refer to those which are divided by colors in which the subframes are displayed.

For example, four green subframes and three red-blue subframes are alternately displayed on the pixel array section, by sequentially supplying, to the pixel array section, drive signals themselves corresponding to green each of which is generated on the basis of an $n^{th}$ input frame and an $(n-1)^{th}$ input frame or on the basis of the $n^{th}$ input frame; and combinations each made up of two drive signals corresponding respectively to red and blue which two signals are generated on the basis of the $n^{th}$ input frame and the $(n-1)^{th}$ input frame. In this case, two types of seven subframes are displayed in total on the pixel array section.

In other words, the types of subframes in this example are the two types: green subframe and red-blue subframe. In this example, seven subframes are displayed in total. The number of the subframes is not an integral multiple of 2 which is the number of the types of the subframes.

The arrangement makes it possible to prevent only a specific color from being displayed in a last subframe in each frame. That is, in a case where a last subframe in one frame corresponds to green in the example above, a last subframe in a next frame corresponds to red and blue.

This makes it possible to suppress color breaking, with prevention of occurrence thereof on a specific color.

The method of the present invention is preferably arranged such that: a combination of drive signals of the plurality of colors are generated on the basis of an $n^{th}$ input frame and an $(n-1)^{th}$ input frame or on the basis of the $n^{th}$ input frame and are supplied in a combination thereof to the pixel array section, so that at least one of subframes displayed by the pixel array section is generated from the combination of drive signals of the plurality of colors.

According to the method, by displaying at least one subframe, an image is displayed which contains a plurality of colors. This makes it possible to increase a frame rate for image display. This makes it possible to suppress color breaking more effectively.

The method preferably further includes the step of selecting, from the drive signals of the plurality of colors generated by said generation, drive signals of the plurality of colors to be supplied to the pixel array section in sync with a timing of lighting of light sources corresponding respectively to the color.

Thus, the method includes the step of selecting drive signals of the plurality of colors to be supplied to the pixel array section in sync with a timing of lighting of light sources corresponding respectively to the color. This allows the pixel array section to display, at a sufficient luminance, images which correspond respectively to the plurality of colors.

The driving device may be realized by a computer. In this case, the present invention encompasses (i) a program for causing the computer to serve as the sections, thereby realizing the driving device by the computer, and (ii) a computer-readable recording medium storing the program.

As described above, the driving device of the present invention includes generation means for generating pixel values of driving signals of at least one color for pixels of the at least one color among driving signals of a plurality of colors to be supplied sequentially to the pixel array section, the generation means generating the pixel values for each pixel of the at least one color on the basis of (i) a pixel value of the pixel in a current input frame corresponding to the color of the pixel and (ii) a pixel value of the pixel in a previous input frame corresponding to the color of the pixel. This makes it possible to effectively suppress color breaking, without a large-scale calculation, unlike the image processing apparatus having the movement detector circuit.

For a fuller understanding of the nature and advantages of the invention, reference should be made to the ensuing detailed description taken in conjunction with the accompanying drawings.

BRIEF DESCRIPTION OF DRAWINGS

FIG. 6 is a table for explaining the second embodiment of the present invention, which table shows input video signals in each frame and drive signals corresponding to the input video signals.

DESCRIPTION OF EMBODIMENTS

First Embodiment

The following describes a driving device 1 of a first embodiment, with reference to the drawings.

Figure 1:
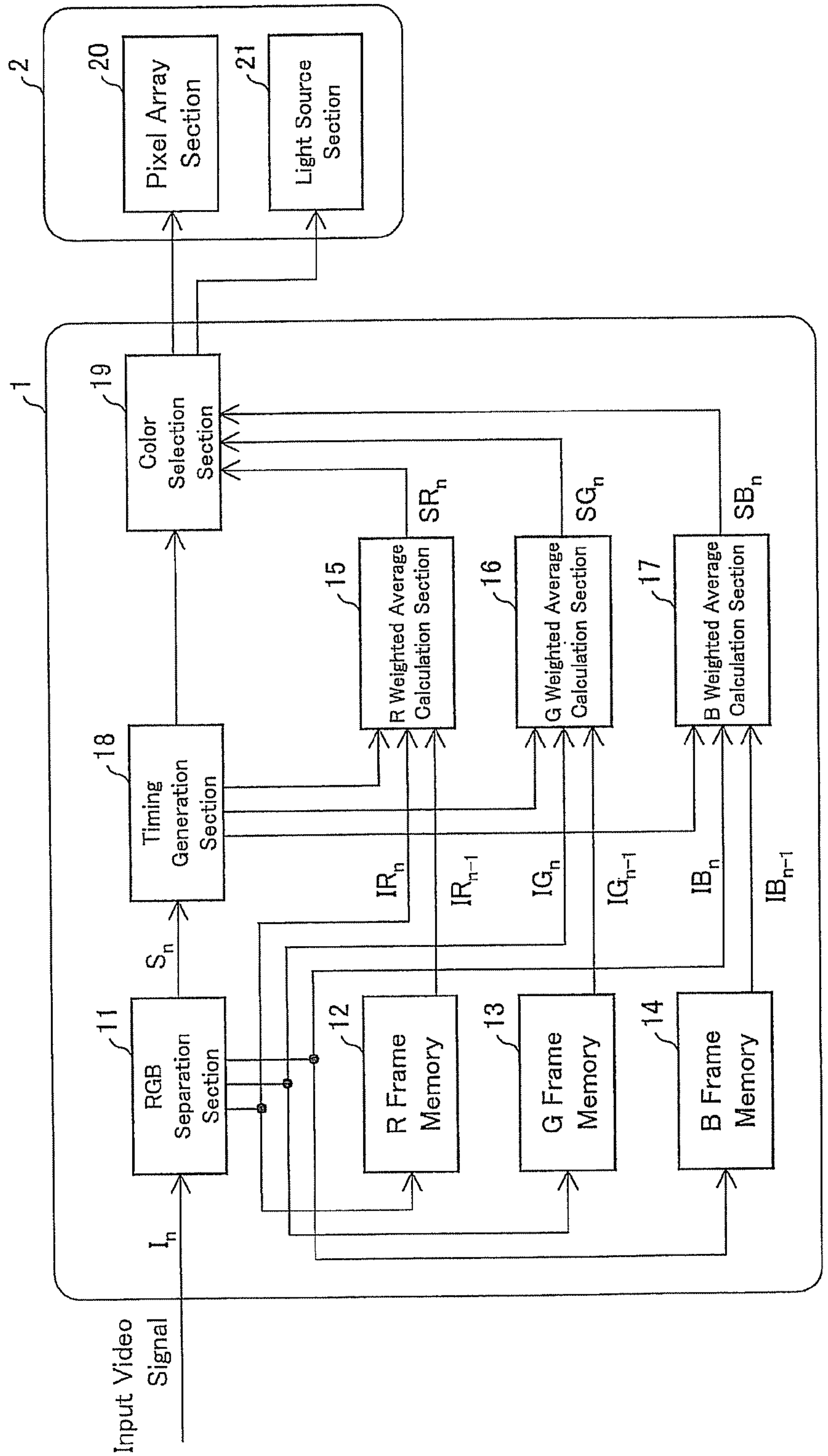
FIG. 1 is a block diagram of a first embodiment of the present invention, which block diagram illustrates respective arrangements of a driving device and an image display section.

First, the following describes an arrangement of the driving device 1 of the present embodiment, with reference to FIG. 1. FIG. 1 is a block diagram illustrating the driving device 1 and a pixel display section 2 of the present embodiment. As illustrated in FIG. 1, the driving device 1 is an apparatus for driving the image display section 2 which includes a pixel array section 20 and a light source section 21. For example, the driving device 1 and, for example, together with the image display section 2 are built in an image display device.

The light source section 21 is a means for sequentially irradiating the pixel array section 20 with lights of different colors. The light source section 21 can be realized by, e.g., LEDs of three colors (RGB) which LEDs sequentially light up. The light source section 21 may be realized by a laser light source, a fluorescent tube, a lamp, or the like, instead of LEDs. The pixel array section 20 includes a plurality of pixels arranged in an array. The pixel array section 20 is a means for controlling, pixel-by-pixel, a transmittance or a reflectance of light emitted from the light source section 21. For example, the pixel array section 20 can be realized by a transmissive or reflective liquid crystal display panel (In the case of the transmissive liquid crystal display panel, the light source section 21 is disposed behind the pixel array section 20. In the case of the reflective liquid crystal display panel, the light source section 22 is disposed in front of the pixel array section 20). The pixel array section 20 may be realized by EW (electrowetting) devices arrayed in an array, or by DMDs (digital mirror devices) arrayed in an array. As described below, a transmittance or a reflectance of the pixel array section 20 is controlled by the driving device 1. The driving device 1 of the present embodiment controls the pixel array section 20 by so-called field sequential driving (also referred to as time-division driving). However, the present invention is not limited to this.

As illustrated in FIG. 1, the driving device 1 includes an RGB separation section 11, an R frame memory 12, a G frame memory 13, a B frame memory 14, an R weighted average calculation section 15, a G weighted average calculation section 16, a B weighted average calculation section 17, a timing generation section 18, and a color selection section 19.

Input video signals I are sequentially supplied to the driving device 1. The present embodiment assumes that the input video signals I be 60-Hz progressive signals. That is, the present embodiment assumes that the input video signals I be supplied to the RGB separation section 11 one by one in every frame, and the input video signals I have a frame rate of 60 Hz. An $n^{th}$ frame corresponding to an $n^{th}$ input video signal I is hereinafter referred to as frame $I_n$.

The RGB separation section 11 is a means for separating, in every frame, an input video signal I into video signals IR, IG, and IB which correspond respectively to the three primary colors: red, green, and blue. That is, the RGB separation section 11 is a means for separating the frame $I_n$ corresponding to the $n^{th}$ input video signal I into video signals $IR_n$, $IG_n$, and $IB_n$. The video signals IR, IG, and IB are video signals indicative of gradation levels of red (R), green (G), and blue (B), respectively.

Further, the RGB separation section 11 supplies seed signals S to the timing generation section 18 in sync with receipt of the input, video signals I. That is, the RGB separation section 11 supplies a 60-Hz seed signal $S_n$ to the timing generation section 18 in sync with the receipt of the input video signal I.

Schematically, the timing generation section 18 is a means for generating, on the basis of a seed signal S, timing signals for specifying timings when subframes corresponding respectively to RGB are displayed.

Specifically, on the basis of a seed signal S, the timing generation section 18 generates a 60-Hz timing signal A in phase with the seed signal S, a 60-Hz timing signal B which is phase-shifted by ⅓ cycle from the seed signal S, and a 60-Hz timing signal C which is phase-shifted by ⅔ cycle from the seed signal S.

The three timing signals A, B, and C respectively are signals for specifying timings when a green subframe, a blue subframe, and a red subframe are displayed. That is, subframes in every frame are displayed in such a manner that: first, a blue subframe is displayed; second, a red subframe is displayed after a delay corresponding to a phase difference of the ⅓ cycle; and finally, a green subframe is displayed after a delay corresponding to a phase difference of the ⅔ cycle, in the present embodiment as described below.

Hereinafter, a subframe to be lastly displayed in every frame is referred to as reference subframe. In the present embodiment, the reference subframes are green subframes.

The timing signals A, B, and C are transmitted to the G weighted average calculation section 16, the B weighted average calculation section 17, and R weighted average calculation section 15 which are described later, respectively. The timing signals A, B, and C are also transmitted to the color selection section 19.

The video signals $IR_n$, $IG_n$, and $IB_n$ are supplied to the R frame memory 12, the G frame memory 13, and the B frame memory 14, respectively. On the other hand, the video signals $IR_n$, $IG_n$, and $IB_n$ are also supplied to the R weighted average calculation section 15, the G weighted average calculation section 16, and the B weighted average calculation section 17, respectively.

The R frame memory 12, the G frame memory 13, and the B frame memory 14 are means for temporarily storing the video signals IR, IG, and IB, respectively. Specifically, the R frame memory 12, the G frame memory 13, and the B frame memory 14 temporarily store the video signals IR, IG, and IB which are supplied in every frame. In a case where the R frame memory 12, the G frame memory 13, and the B frame memory 14 receive new video signals IR, IG, and IB of a new frame, the R frame memory 12, the G frame memory 13, and the B frame memory 14 output the previously-stored video signals IR, IG, and IB to the R weighted average calculation section 15, the G weighted average calculation section 16, and the B weighted average calculation section 17 so as to store the new video signals IR, IG, and IB instead.

That is, in the present embodiment, the R frame memory 12, the G frame memory 13, and the B frame memory 14 store supplied video signals $IR_{n-1}$, $IG_{n-1}$, and $IB_{n-1}$ until the R frame memory 12, the G frame memory 13, and the B frame memory 14 receive new video signals $IR_n$, $IG_n$, and $IB_n$. In a case where the R frame memory 12, the G frame memory 13, and the B frame memory 14 receive the new video signals $IR_n$, $IG_n$, and $IB_n$, the R frame memory 12, the G frame memory 13, and the B frame memory 14 output the previously-stored video signals $IR_{n-1}$, $IG_{n-1}$, and $IB_{n-1}$ to the R weighted average calculation section 15, the G weighted average calculation section 16, and the B weighted average calculation section 17 so as to overwrite the previously-stored video signals $IR_{n-1}$, $IG_{n-1}$, and $IB_{n-1}$ with the new video signals $IR_n$, $IG_n$, and $IB_n$.

Each of the R weighted average calculation section 15, the G weighted average calculation section 16, and the B weighted average calculation section 17 is a generation means for obtaining a weighted average of (i) a value of a video signal corresponding to at least one color which video signal has been separated from an input video signal of a current input frame and (ii) a value of a video signal corresponding to the at least one color which video signal has been separated from an input video signal of a previous input frame, so as to obtain a value of a drive signal corresponding to the at least one color.

In the present embodiment, the R weighted average calculation section 15 is a means for obtaining a weighted average of (i) a value of a video signal corresponding to red which video signal has been separated from an input video signal of a current input frame and (ii) a value of a video signal corresponding to red which video signal has been separated from an input video signal of a previous input frame, so as to obtain a value of a drive signal corresponding to red.

Similarly, the B weighted average calculation section 17 is a means for obtaining a weighted average of (i) a value of a video signal corresponding to blue which video signal has been separated from the input video signal of the current input frame and (ii) a value of a video signal corresponding to blue which video signal has been separated from the input video signal of the previous input frame, so as to obtain a value of a drive signal corresponding to blue.

"Weighted average calculation" refers to a calculation in which found is an average of a plurality of elements which are weighted by respective different weights. In general, by using "m" number of elements: $x_1$, $x_2$, . . . , and $x_m$, and their respective weighting factors: $w_1$, $w_2$, . . . , and $w_m$, the weighted average calculation is defined as: $w_1*x_1+w_2*x_2+ \ldots w_m*x_m$. The weighting factors satisfy the equation: $w_1+w_2+ \ldots +w_m=1$.

On the basis of input video signals $IR_n$ and $IR_{n-1}$ corresponding to red, the R weighted average calculation section 15 in the present embodiment performs the calculation: $SR_n=\alpha_1*IR_{n-1}+\alpha_2*IR_n$ so as to generate a drive signal $SR_n$ corresponding to red.

Similarly, on the basis of input video signals $IB_n$ and $IB_{n-1}$ corresponding to blue, the B weighted average calculation section 17 performs the calculation: $SB_n=\alpha_2*IB_{n-1}+\alpha_1*IB_n$ so as to generate a drive signal $SB_n$ corresponding to blue.

In the present embodiment, specific values of the weighting factors $\alpha_1$ and $\alpha_2$ are ⅓ and ⅔, respectively. Further, in the present embodiment, each of the weighted average calculations is performed for every target pixel.

On the other hand, on the basis of an input video signal $IG_n$ corresponding to green and the relationship: $SG_n=IG_n$, the G weighted average calculation section 16 generates a drive signal $SG_n$ corresponding to green. That is, in the present embodiment, the G weighted average calculation section 16 outputs, to the color selection section 19 as it is, the input video signal for the current input frame which input video signal corresponds to green, as a drive signal for the current input frame which drive signal corresponds to green.

The drive signals $SR_n$, $SG_n$, and $SB_n$ generated by the R weighted average calculation section 15, the G weighted average calculation section 16, and the B weighted average calculation section 17 are sequentially transmitted to the color selection section 19 in order of $SB_n$, $SR_n$, and $SG_n$, in accordance with the timing signals A, B, and C transmitted from the timing generation section 18.

The color selection section 19 is a selection means for selecting, from the drive signals $SB_n$, $SR_n$, and $SG_n$ corresponding to RGB colors, a drive signal to be supplied to the pixel array section 20, in sync with a lighting timing of the light source section 21 which corresponds to RGB colors.

Specifically, the color selection section 19 selects the drive signals $SG_n$, $SB_n$, and $SR_n$ one by one in sync with the timing signals transmitted from the timing generation section 18 so as to sequentially supply the drive signals to the pixel array section 20 in order of $SB_n$, $SR_n$, and $SG_n$.

Further, the color selection section 19 supplies, to the light source section 21, those light source section lighting signals corresponding to RGB colors which are in sync with the timing signals A, B, and C transmitted from the timing generation section 18.

That is, in sync with the drive signal $SG_n$, the color selection section 19 supplies, to the light source section 21, a light source section lighting signal for turning on a green light source in the light source section 21. Similarly, in sync with the drive signals $SB_n$ and $SR_n$, the color selection section 19 supplies, to the light source section 21, light source section lighting signals for turning on blue and red light sources in the light source section 21.

In accordance with the drive signals thus transmitted and the light source section lighting signals thus transmitted, the image display section 2 displays subframes in every frame in such a manner that: first, a blue subframe is displayed; second, a red subframe is displayed after a delay corresponding to a phase difference of the ⅓ cycle; and finally, a green subframe is displayed after a delay corresponding to a phase difference of the ⅔ cycle.

The above has explained the arrangement of the driving device 1.

Figure 2:
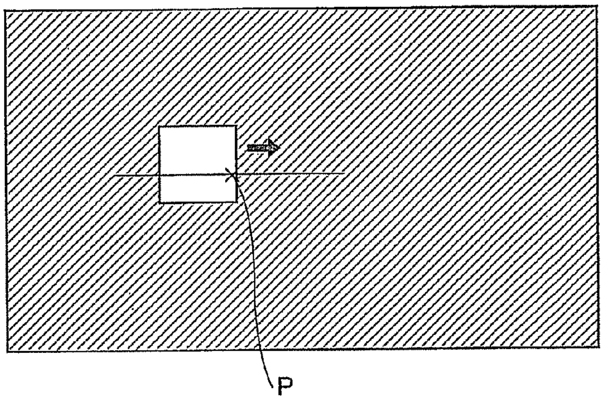
FIG. 2 is a view for explaining color breaking, which view schematically illustrates a white object moving on an image display section.

In order to explain how the use of the driving device 1 makes it possible to suppress the color breaking, the following deals with, as in the explanation above, a case where a line of sight of a viewer follows the edge P of the white object illustrated in FIG. 2.

The white object moves rightward along the horizontal line. Accordingly, the point of sight moves on the display screen of FIG. 2 while following the edge P. This movement of the point of sight corresponds to the downward movement along the follow line Q in (b) of FIG. 3.

Figure 3:
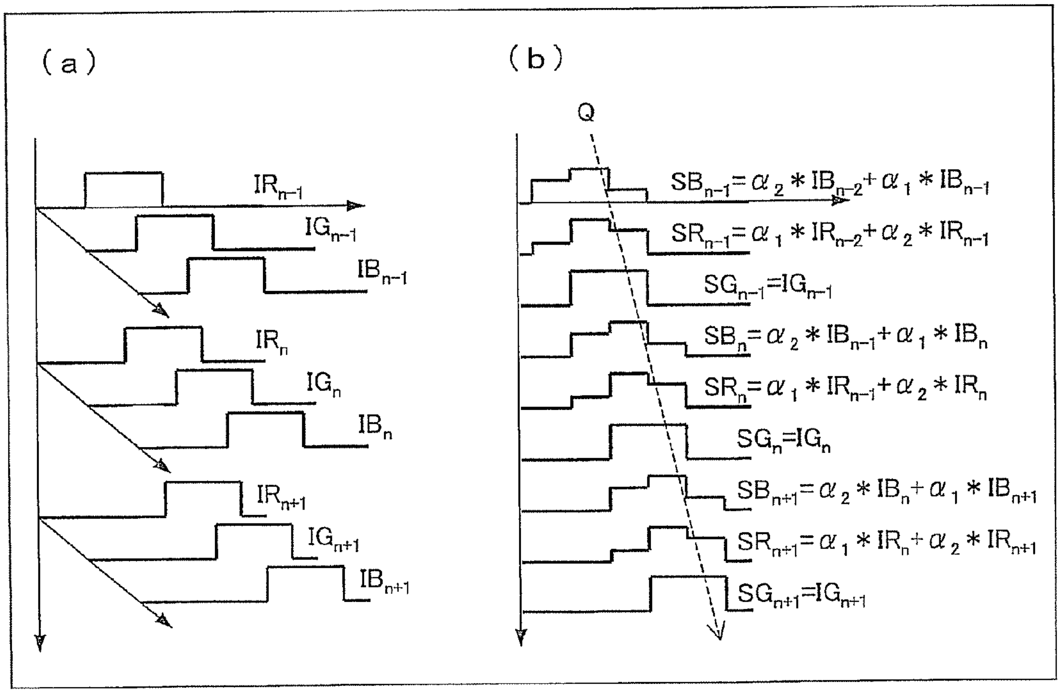
FIG. 3 is a view for explaining the first embodiment of the present invention. (a) of FIG. 3 is a view schematically illustrating video signals corresponding to RGB colors of an input video signal which is supplied in every frame. (b) of FIG. 3 is a view illustrating drive signals which are outputted from the drive apparatus of the first embodiment.

As illustrated in (b) of FIG. 3, the follow line Q intersects with waveforms which indicate the drive signals corresponding RGB colors, at points where values of the drive signals are not zero. This indicates that a field-sequential liquid crystal display apparatus having a drive circuit 1 makes it possible to appropriately superimpose subframes of the three primary colors on a retina of the viewer. In other words, this indicates that the use of the drive circuit 1 suppresses the color breaking.

Thus, image display is performed in such a manner that a ratio among the color components is controlled in accordance with time progression. This makes it possible to alleviate color breaking which is recognizable for a viewer.

In the present embodiment, the blue and red subframes are subjected to the weighted average calculations. Accordingly, there is a risk that an error or the like caused in the calculation leads to deterioration of signal accuracy of a drive signal for a blue or red subframe. In contrast, the drive signals corresponding to green exactly are video signals corresponding to the green component of input video signals. Therefore, signal accuracy is not deteriorated as to a drive signal corresponding to green. In image display in the three primary colors of RGB, green is displayed with a highest display luminance in general. Therefore, a viewer has a highest visibility for green. Accordingly, by adopting an arrangement which prevents deterioration of green in particular, it is possible to alleviate deterioration of an whole image.

By thus performing simple video signal processing which are the weighted average calculations, the driving device 1 of the present embodiment makes it possible to suppress color breaking. Further, each of the weighted average calculations can be performed as to every target pixel, without reference to video signals in the vicinity of the target pixel. Accordingly, each of the R weighted average calculation section 15, the G weighted average calculation section 16, and the B weighted average calculation section 17 can perform the weighted average calculations at very high speed. Further, the weighted average calculations make it possible to generate values that the drive signals corresponding to RGB colors have for the pixels, without use of any motion vector. Therefore, there is no risk of imaging failure, unlike the case of a calculation using a motion vector.

Depending on a characteristic of the image display section 2, a nonlinear relationship such as a gamma luminance characteristic can be seen between (i) luminances of an image to be actually displayed and (ii) the drive signals to be supplied to the image display section 2. In such a case, it is more preferable that the R weighted average calculation section 15, the G weighted average calculation section 16, and the B weighted average calculation section 17 perform the weighted average calculations on the basis of luminances obtained by performing gamma correction on video signals.

Specifically, the R weighted average calculation section preferably generates a drive signal by the following equation: $SR_n=f_r^{-1}\{\alpha_1*f_R(IR_{n-1})+\alpha_2*f_R(IR_n)\}$. In the equation, $f_r$ and $f_R$ represent gamma correction functions for a drive signal corresponding to red, and $f_r^{-1}$ represents an inverse function of $f_r$. Also as for drive signals corresponding to green and blue, similarly, the G weighted average calculation section 16 and the B weighted average calculation section 17 preferably generate respective drive signals by their respective following equations: $SG_n=f_g^{-1}\{f_G(IG_{n-1)\}; \text{ and } SBn}=f_b^{-1}\{\alpha_2+f_B(IB_{n-1})+\alpha_1*f_B(IB_n)\}$. In the equations, $f_g$ and $f_G$ represent gamma correction functions for a drive signal corresponding to green, and $f_b$ and $f_B$ represent gamma correction functions for a drive signal corresponding to blue. $f_g^{-1}$ and $f_b^{-1}$ represent inverse functions of $f_g$ and $f_b$, respectively.

However, nonlinear calculation can lead to increase of scale of the driving device 1. In addition, a certain effect can be expected even if the weighted average calculations are performed without gamma correction. Therefore, whether to perform gamma correction may be determined in a design phase in accordance with a target product price etc.

According to the present embodiment, subframes are displayed in order of blue, red and green. However, the present invention is not limited to this. Further, the above has dealt with a case where a frame rate of an input video signal is 60 Hz, and each frame is divided into subframes equally in terms of time. However, the present invention is not limited to this. That is, the present invention is also applicable to such cases that each frame is divided into subframes of two or not less than four, or each frame is divided into subframes unequally in terms of time. Further, the present invention is also applicable to such a case that the light source section 21 has light sources corresponding to colors of not less than four.

More specifically, it may be arranged such that the number of subframes in one frame is not an integral multiple of 3 which is the number of the primary colors in the present embodiment. This makes it possible to prevent a color of a reference subframe in each frame from becoming close to a specific color. Such an arrangement makes it possible to prevent image deterioration from occurring severely on a specific color, and also suppress color breaking.

The weighted average calculations to be performed by the R weighted average calculation section 15, the G weighted average calculation section 16, and the B weighted average calculation section 17 is not limited to the example of the present embodiment. That is, the weighted average calculations of the present embodiment are generally applicable to calculations for generating video signals of subframes on the basis of those video signals of a previous input frame which correspond to RGB colors and those corresponding video signals of a current input frame which correspond to RGB colors. In other words, the weighted average calculations to be performed by the R weighted average calculation section 15, the G weighted average calculation section 16, and the B weighted average calculation section 17 can be generally extended to the following calculations: $SR_n=F_R(IR_{n-1}, IR_n)$; $SG_n=F_G(IG_{n-1}, IG_n)$; and $SR_n=F_B(IB_{n-1}, IB_n)$. In the equations, each of $F_R$, $F_G$, and $F_B$ represents a function to which a video signal of a previous input frame and a video signal of a current input frame are inputted as input values so that video signals of subframes are outputted from the function.

By providing the driving device 1 in a television receiver for receiving a television image and reproducing the television image, it is possible to realize a television receiver having less color breaking, without significant increase in cost. As for apparatuses other than television receivers, by providing the driving device 1 in a display monitor device for generally displaying a color image (a color image or a color video image which is outputted from, e.g., a PC), it is possible to realize a display monitor device having less color breaking, without significant increase in cost.

Second Embodiment

The following describes an image display device 4 and a driving device 5 of a second embodiment, with reference to drawings. The following first describes the image display device 4 and the driving device 5 of the present embodiment, with reference to FIGS. 4 and 5. Each of the image display device 4 and the driving device 5 can be used in field sequential image display.

Figure 4:
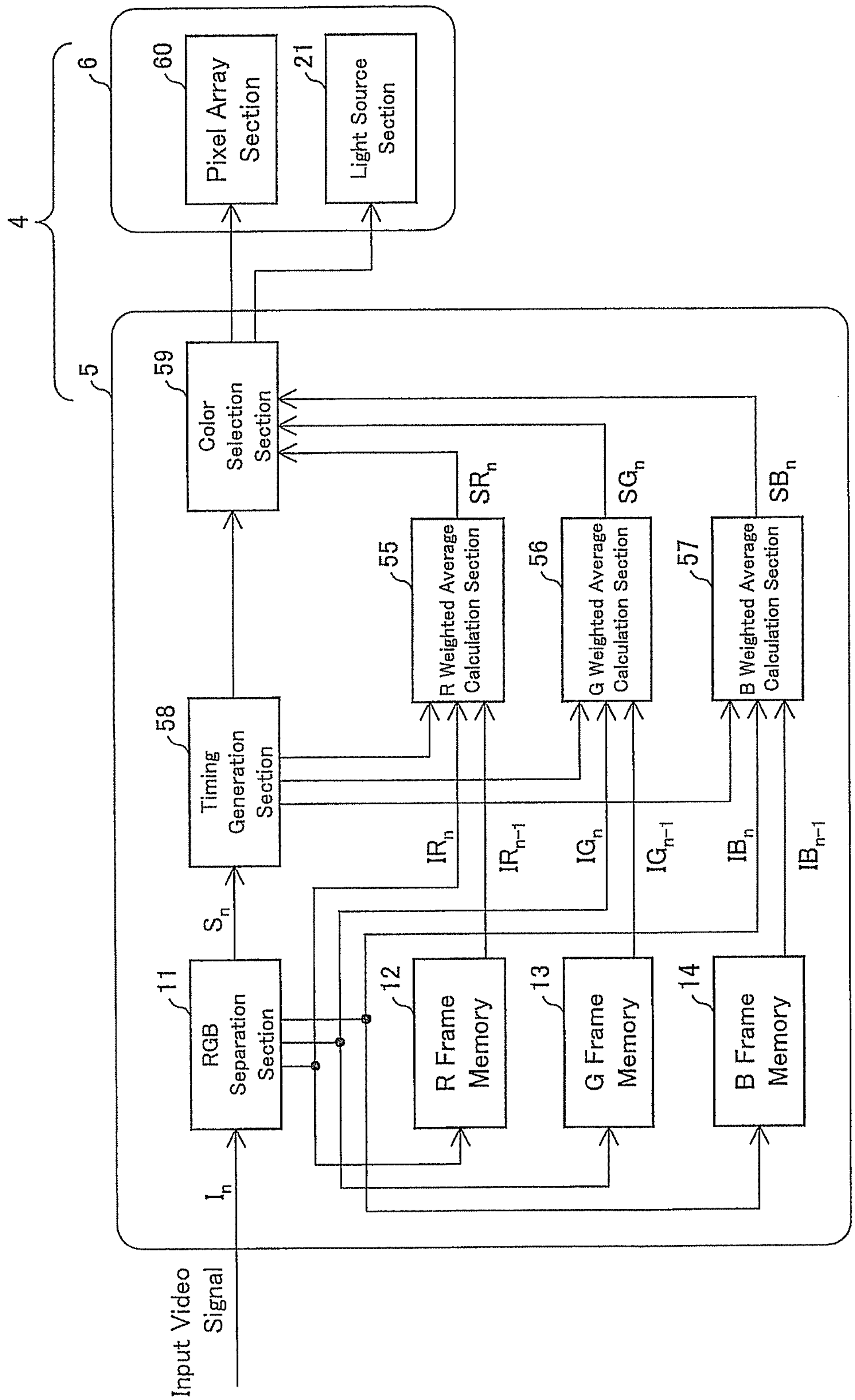
FIG. 4 is a block diagram of a second embodiment of the present invention, which block diagram illustrates respective arrangements of another driving device and another image display section.

FIG. 4 is a block diagram illustrating the image display device 4 of the present embodiment. As illustrated in FIG. 4, the image display device 4 includes the driving device 5 and an image display section 6. The following omits to describe members which are functionally the same as those of the First Embodiment, and such members are given common reference signs.

As illustrated in FIG. 4, the image display section 6 includes a pixel array section 60 and a light source section 21. As is the case with the pixel array section 20 in the first embodiment, the pixel array section 60 is a member for adjusting, pixel by pixel in accordance with a supplied video signal, a gradation level of light of RGB colors emitted from a light source section 21. However, unlike the pixel array section 20, the pixel array section 60 of the present embodiment has two kinds of pixels having color filters with two different characteristics.

Figure 5:
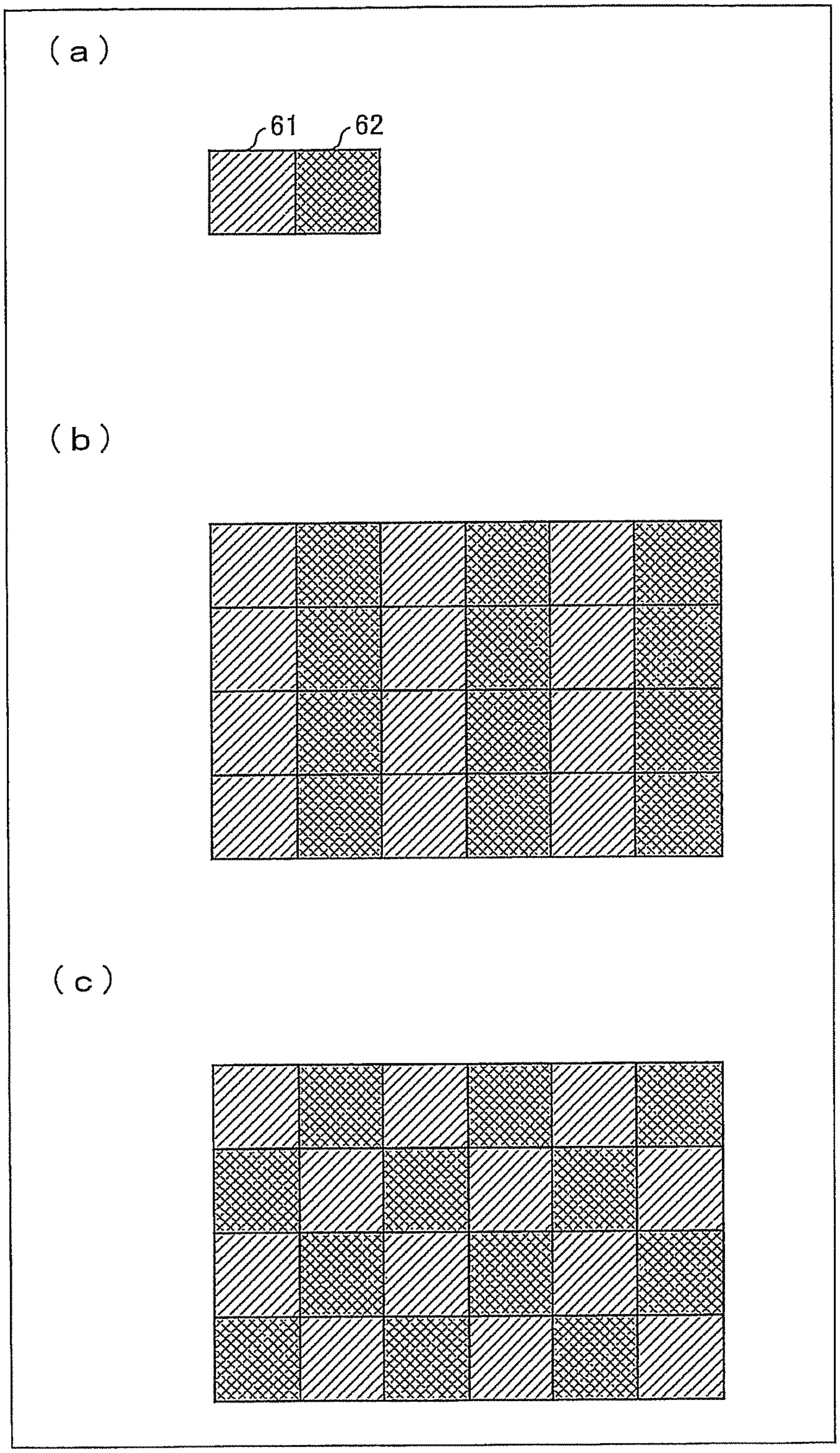
FIG. 5 is a view for explaining the second embodiment of the present invention. (a) of FIG. 5 is a view schematically illustrating a pixel having a color filter which does not allow blue light to pass through, and a pixel having a color filter which does not allow red light to pass through. (b) of FIG. 5 is a view schematically illustrating a pixel array section in which the two types of pixels are arranged in alternate columns. (c) of FIG. 5 is a view schematically illustrating the pixel array section in which the two types of pixels are arranged in a checkerboard pattern.
Figure 7:
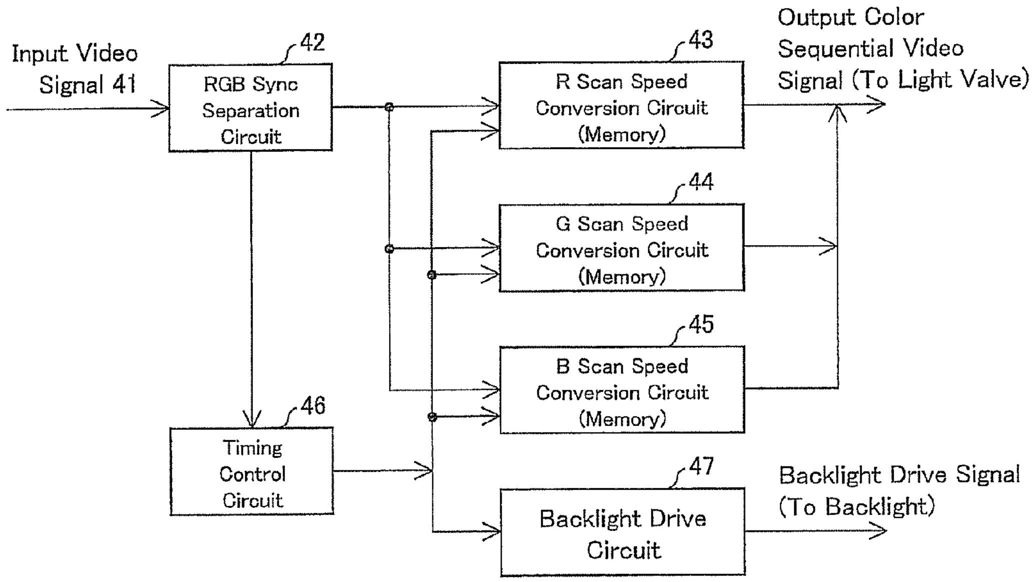
FIG. 7 is a block diagram illustrating a drive circuit which is provided in a conventional field-sequential liquid crystal display apparatus.
Figure 8:
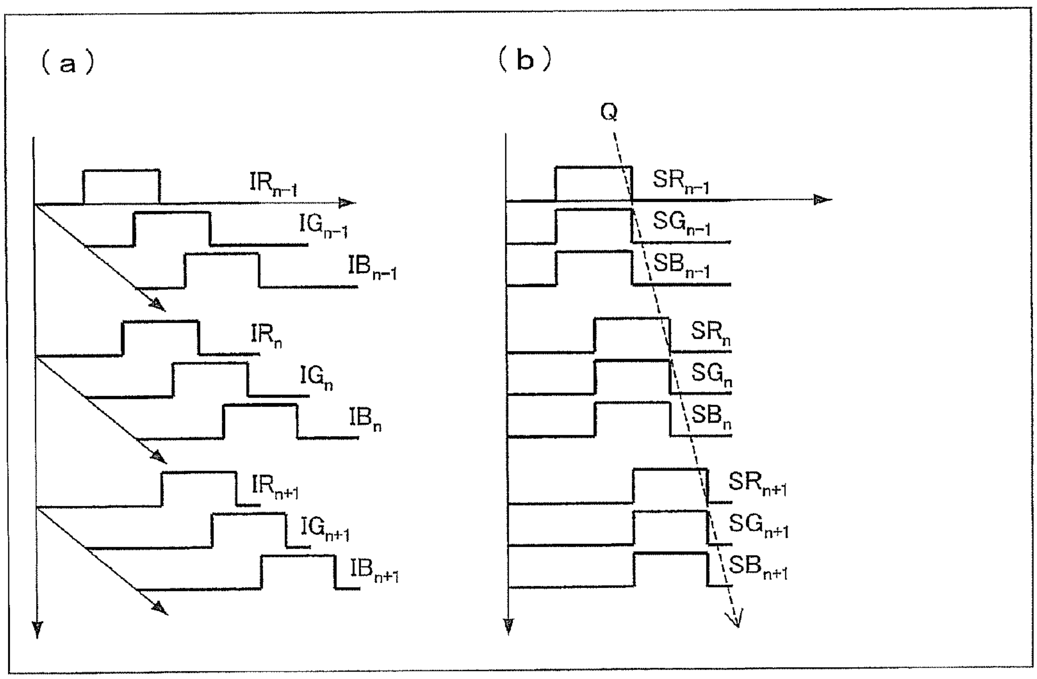
FIG. 8 is a view for explaining the drive circuit which is provided in the conventional field-sequential liquid crystal display apparatus. (a) of FIG. 8 is a view schematically illustrating video signals corresponding to RGB colors of an input video signal which is supplied in every frame. (b) of FIG. 8 is a view illustrating drive signals which are outputted from the drive circuit provided in the conventional field-sequential liquid crystal display apparatus.

Specifically, as illustrated in (a) of FIG. 5, the pixel array section 60 has pixels having color filters 61 which do not allow blue light to pass through and pixels having color filters 62 which do not allow red light to pass through.

The color filters 61 and 62 are arranged so that one color filter 61 and one color filter 62 are adjacent to each other, as illustrated in (a) of FIG. 5. Each of (b) and (c) of FIG. 5 is a view schematically illustrating how the color filters 61 and 62 are arranged in the pixel array section 60. Specifically, the color filters 61 and 62 can be two-dimensionally arranged in the pixel array section 60 in such a manner that: as illustrated in (b) of FIG. 5, columns of the color filters 61 and columns of the color filters 62 are alternately arranged; as illustrated in (c) of FIG. 5, the color filters 61 and 62 are arranged in a checkerboard pattern; or the arrangements of (b) and (c) of FIG. 5 are combined. A suitable arrangement can be selected according to use.

Such arrangements of the pixel array section 60 allow pixels having the color filters 61 and pixels having the color filters 62 to separately adjust a gradation level of red light and that of blue light, respectively, even if red light sources and blue light sources are turned on at a time.

Thus, the present embodiment makes it possible to display, in one subframe, a red image and a blue image which are displayed in respective different subframes in the first embodiment.

The color filters 61 and 62 both allow green light to pass through. Accordingly, subframes for displaying green images are arranged in the same manner as the first embodiment.

The driving device 5 is an apparatus for driving the image display section 6.

As illustrated in FIG. 4, the driving device 5 of the present embodiment has nearly the same arrangement as the driving device 1 of the first embodiment. Specifically, the driving device 5 includes an RGB separation section 11, an R frame memory 12, a G frame memory 13, a B frame memory 14, an R weighted average calculation section 55, a G weighted average calculation section 56, a B weighted average calculation section 57, a timing generation section 58, and a color selection section 59. The RGB separation section 11, the R frame memory 12, the G frame memory 13, and the B frame memory 14 are identical with the RGB separation section 11, the R frame memory 12, the G frame memory 13, and the B frame memory 14 in the driving device 1, respectively.

In the present embodiment, each frame is divided into seven subframes in total, unlike the first embodiment. In addition, in the present embodiment, each frame is made up of subframes for displaying green images and subframes for displaying red images and blue images, unlike the first embodiment.

The following describes sections of the driving device 5 of the present embodiment, with reference to FIG. 4.

The present embodiment also assumes that the input video signals I be 60-Hz progressive signals, as is the case with the first embodiment. That is, the present embodiment assumes that the input video signals I be supplied to the RGB separation section 11 one by one in every frame, and the input video signals I have a frame rate of 60 Hz. An $n^{th}$ frame corresponding to an $n^{th}$ input video signal I is hereinafter referred to as frame I.

The R weighted average calculation section 55 is a means for performing a weighted average calculation using an input video signal $IR_n$ and that input video signal $IR_{n-1}$ of a previous input frame which is stored in the R frame memory 12, so as to generate a drive signal $SR_n$. The same holds for the G weighted average calculation section 56 and the B weighted average calculation section 57.

Respective weighted average calculations to be performed by the R weighted average calculation section 55, the G weighted average calculation section 56, and the B weighted average calculation section 57 are different from those in the first embodiment. For each frame, the R weighted average calculation section 55, the G weighted average calculation section 56, and the B weighted average calculation section 57 in the present embodiment generate seven drive signals for generating seven subframes in total, on the basis of input video signals $IR_n$, $IG_n$, and $IB_n$ corresponding to RGB colors and those corresponding input video signals $IR_{n-1}$, $IG_{n-1}$, and $IB_{n-1}$ of a previous input frame which are stored in the R frame memory 12, the G frame memory 13, and the B frame memory 14.

FIG. 6 is a table showing how the R weighted average calculation section 55, the G weighted average calculation section 56, and the B weighted average calculation section 57 perform the weighted average calculations of the input video signals IR, IG, and IB so as to generate the drive signals SR, SG, and SB which correspond to RGB colors.

As shown in FIG. 6, in the present embodiment, sequentially supplied to the pixel array section 60 are: drive signals themselves corresponding to green each of which is generated on the basis of an $(n-1)^{th}$ input frame and an $(n-2)^{th}$ input frame; and combinations each made up of two drive signals corresponding respectively to red and blue which two signals are generated on the basis of the input frame and the $(n-2)^{th}$ input frame or on the basis of the $(n-1)^{th}$ input frame. As a result, three green subframes and four red-blue subframes are alternately displayed on the pixel array section 60. That is, two types of seven subframes are displayed in total on the pixel array section 60 in accordance with the input frames above.

As shown in FIG. 6, further, sequentially supplied to the pixel array section 60 are: drive signals themselves corresponding to green each of which is generated on the basis of an $n^{th}$ input frame and an $(n-1)^{th}$ input frame or on the basis of the $n^{th}$ input frame; and combinations each made up of two drive signals corresponding respectively to red and blue which two signals are generated on the basis of the $n^{th}$ input frame and the $(n-1)^{th}$ input frame. As a result, four green subframes and three red-blue subframes are alternately displayed on the pixel array section 60. That is, two types of seven subframes are displayed in total on the pixel array section 60 in accordance with the input frames above.

Specifically, as shown in FIG. 6, seven subframe numbers are assigned to each frame, and each subframe belongs to any one of the two subframe types: G or RB. The subframe type G indicates a green subframe, and the subframe type RB indicates a subframe corresponding to red and blue.

The subscripts of the input signals IR, IG, and IB indicate frame numbers, as is the case with the first embodiment. First subscripts (n−1, n, etc.) of the drive signals SR, SG, and SB indicate frame numbers, and second subscripts (1, 2, . . . , and 7) are subframe numbers in each frame. For example, $SR_{n-1,3}$ indicates a subframe output signal for a third subframe in the $(n-1)^{th}$ frame.

A coefficient $a_i$ which is used in the weighted average calculations is defined as: $a_i=i/7$. In each of the equations for the weighted average calculations, a sum of the coefficients $a_i$ is 1.

In each frame, each of the drive signals SR, SG, and SB is supplied to the color selection section 59 in order of the second subscripts.

As shown in FIG. 6, in a last subframe in each frame, i.e., in a reference subframe, the R weighted average calculation section 55, the G weighted average calculation section 56, and the B weighted average calculation section 57 output color components of the previous input frame as they are.

FIG. 6 also shows values of drive signals which are generated by the R weighted average calculation section 55, the G weighted average calculation section 56, and the B weighted average calculation section 57, for each of the cases where input video signals $IR_{n-1}$, $IG_{n-1}$, and $IB_{n-1}$ in the $(n-1)^{th}$ frame have a value of 100, and input video signals $IR_n$, $IG_n$, and $IB_n$ in the $n^{th}$ frame have a value of 0. Note that input video signals $IR_{n-2}$, $IG_{n-2}$, and $IB_{n-2}$ in the $(n-2)^{th}$ frame which are necessary for finding subframe output signals for the $(n-1)^{th}$ frame have a value of 0.

The timing generation section 58 generates timing signals for specifying respective starting points of the seven subframes in each frame, in accordance with a seed signal S supplied from the RGB separation section 11. More specifically, in accordance with a 60-Hz seed signal S supplied from the RGB separation section 11, the timing generation section 58 generates two 210-Hz timing signals which are phase-shifted by ½ cycle.

One of the two 210-Hz timing signals (hereinafter, referred to as timing signal D) is transmitted to the G weighted average calculation section 56. The other one (hereinafter, referred to as timing signal E) is transmitted to each of the R weighted average calculation section 55 and the B weighted average calculation section 57.

The drive signals SR, SG, and SB which are generated by the R weighted average calculation section 55, the G weighted average calculation section 56, and the B weighted average calculation section 57 are sequentially transmitted to the color selection section 59 in accordance with the timing signals D and E which are supplied from the timing generation section 58. More specifically, in accordance with the 210-Hz timing signal D, the G weighted average calculation section 56 supplies the drive signal G corresponding to green, to the color selection section 59, at 210 Hz. On the other hand, in accordance with the timing signal E, the R weighted average calculation section 55 and the B weighted average calculation section 57 supply the drive signals SR and SB corresponding respectively to red and blue, to the color selection section 59, at a time.

In the present embodiment, the drive signals SG corresponding to green are signals for controlling all the pixels in the pixel array section 60. In contrast, the drive signals SR corresponding to red are drive signals for controlling the pixels having the color filters 61, and the drive signals SB corresponding to blue are drive signals for controlling the pixels having the color filters 62.

In sync with the timing signal D supplied from the timing generation section 58, the color selection section 59 selects the drive signal SG corresponding to green so as to supply the drive signal SG to the pixel array section. 20. Similarly, in sync with the timing signal E supplied from the timing generation section 58, the color selection section 59 selects the drive signal SR and SB which corresponding respectively to red and blue so as to supply the drive signals SR and SB to the pixel array section 20.

Further, in sync with the timing signal D supplied from timing generation section 58, the color selection section 59 supplies a light source section lighting signal for turning on the green light sources to the light source section 21. Also, in sync with the timing signal E supplied from timing generation section 58, the color selection section 59 supplies a light source section lighting signal for turning on the red and blue LEDs to the light source section 21.

In other words, in sync with the drive signal corresponding to green, a light source section lighting signal for turning on green light sources is supplied to the light source section 21, and on, the other hand, in sync with the drive signals corresponding to red and blue, a light source section lighting signal for turning on red and blue light sources is supplied to the light source section 21.

The image display section 2 displays subframes in accordance with the drive signals and the light source section lighting signals thus transmitted.

In the present embodiment, a sum of (i) the number of times the green light sources are turned on between the input of an $n^{th}$ frame and the input of an $(n+1)^{th}$ frame and (ii) the number of times the combination of the red and blue light sources are turned on therebetween is 7, and the number is not an integral multiple of 2 which is the number of types of the subframes.

In the present embodiment, the two types of drive signals are outputted alternately. Accordingly, the two types of subframes are displayed alternately from one reference subframe to another. That is, in a case where a last subframe in one frame corresponds to green, a last subframe in a next frame corresponds to red and blue.

In the present embodiment, the subframes to be displayed are fewer in type, and sufficiently higher in frame rate, than the subframes of the first embodiment. This makes it possible to effectively suppress color breaking. Further, the present embodiment employs not only the color filters 61 and 62, but also the drive signals generated in the weighted average calculations performed by the R weighted average calculation section 55, the G weighted average calculation section 56, and the B weighted average calculation section 57. This makes it possible to suppress color breaking more effectively.

Further, any color component is assigned to a reference subframe. This prevents only a specific color component from being subjected to a corresponding weighted average calculation. Accordingly, even if, e.g., the weighted average calculations to be performed by the R weighted average calculation section 55, the G weighted average calculation section 56, and the B weighted average calculation section 57 make an error, the error does not occur only on one specific color. This makes it possible to reduce factors of image deterioration, for a whole color image to be recognized by a viewer.

The image display device 4 of the present embodiment thus divides each frame into seven subframes. However, the present invention is not limited to this. The present invention is also applicable to case where each frame is divided into subframes of not more than six or each frame is divided into subframes of not less than eight.

More specifically, the present invention is also applicable to a case where each frame is divided into as many subframes as a multiple of 2 which is the number of types of the subframes of the present embodiment. The arrangement makes it possible to constantly assign, to green, an image to be displayed in a reference subframe. This makes it possible to perform image display, without causing deterioration of a green image which has a highest luminance among the three primary colors.

Further, the present invention is also applicable to a case where the light source section 21 has light sources corresponding to colors of not less than four.

Also in the present embodiment, depending on a characteristic of the image display section 6, a nonlinear relationship such as a gamma luminance characteristic can be seen between (i) luminances of an image to be actually displayed and (ii) the drive signals to be supplied to the image display section 6. In such a case, it is preferable that the R weighted average calculation section 55, the G weighted average calculation section 56, and the B weighted average calculation section 57 perform gamma correction on the drive signals corresponding to RGB colors.

Specifically, the R weighted average calculation section 55 preferably generates a drive signal by the following equation: $SR_{n,I}=f_r^{-1}\{a_{7-i}*f_R(IR_{n-1})+a_i*f_R(IR_n)\}$. In the equation, $f_r$ and $f_R$ represent gamma correction functions for a drive signal corresponding to red, and $f_r^{-1}$ represents an inverse function of $f_r$. Also as for drive signals corresponding to green and blue, similarly, the G weighted average calculation section 56 and the B weighted average calculation section 57 preferably generate respective drive signals by their respective following equations: $SG_{n,I}=f_g^{-1}\{a_{7-i}*f_G(IG_{n-1})+a_i*f_G(IG_n)\}$; and $SB_{n,I}=f_b^{-1}\{a_{7-i}*f_B(IB_{n-1})+a_i*f_B(IB_n)\}$. In the equations, $f_g$ and $f_G$ represent gamma correction functions for a drive signal corresponding to green, and $f_b$ and $f_B$ represent gamma correction functions for a drive signal corresponding to blue. $f_g^{-1}$ and $f_b^{-1}$ represent inverse functions of $f_g$ and $f_b$, respectively.

However, nonlinear calculation can lead to increase of scale of the driving device 5. In addition, a certain effect can be expected even if the weighted average calculations are performed without gamma correction. Therefore, whether to perform gamma correction may be determined in a design phase in accordance with a target product price etc.

The weighted average calculations to be performed by the R weighted average calculation section 55, the G weighted average calculation section 56, and the B weighted average calculation section 57 is not limited to the example of the present embodiment. That is, the weighted average calculations of the present embodiment are generally applicable to calculations for generating video signals of subframes on the basis of those video signals of a previous input frame which correspond to RGB colors and those corresponding video signals of a current input frame which correspond to RGB colors. In other words, the weighted average calculations to be performed by the R weighted average calculation section 55, the G weighted average calculation section 56, and the B weighted average calculation section 57 can be generally extended to the following calculations: $SR_{n,i}=F_R(IR_{n-1}, IR_n)$; $SG_{n,i}=F_G(IG_{n-1}, IG_n)$; and $SR_{n,i}=F_B(IB_{n-1}, IB_n)$. In the equations, each of $F_R$, $F_G$, and $F_B$ represents a function to which a video signal of a previous input frame and a video signal of a current input frame are inputted as input values so that video signals of subframes are outputted from the function.

(Program and Recording Medium)

Each of the circuits (each block) included in the driving device 1 or 5 may be realized by software with the use of a processor such as a CPU. That is, the driving device 1 or 5 can include a CPU (central processing unit), a ROM (read only memory), a RAM (random access memory), and a memory device (recording medium) such as a memory. The CPU executes instructions in control programs for realizing each function. The ROM contains the program which is loaded on the RAM, and the memory device stores the program and various data. The objective of the present invention can also be achieved, by providing the driving device 1 or 5 with a computer-readable recording medium storing control program codes (executable program, intermediate code program, or source program) for the driving device 1 or 5, serving as software for realizing the foregoing respective functions, so that the computer (or CPU or MPU) retrieves and executes the program code stored in the recording medium.

The recording medium may be, for example, a tape, such as a magnetic tape or a cassette tape; a disk including (i) a magnetic disk such as a Floppy (Registered Trademark) disk or a hard disk and (ii) an optical disk such as CD-ROM, MO, MD, DVD, or CD-R; a card such as an IC card (memory card) or an optical card; or a semiconductor memory such as a mask ROM, EPROM, EEPROM, or flash ROM.

Alternatively, the driving device 1 or 5 may be arranged to be connectable to a communications network so that the program codes are delivered over the communications network. The communications network is not limited to a specific one, and therefore can be, for example, the Internet, an intranet, extranet, LAN, ISDN, VAN, CATV communications network, virtual private network, telephone line network, mobile communications network, or satellite communications network. The transfer medium which constitutes the communications network is not limited to a specific one, and therefore can be, for example, wired line such as IEEE 1394, USB, electric power line, cable TV line, telephone line, or ADSL line; or wireless such as infrared radiation (IrDA, remote control), Bluetooth (Registered Trademark), 802.11 wireless, HDR, mobile telephone network, satellite line, or terrestrial digital network. Note that, the present invention can be realized by a computer data signal (i) which is realized by electronic transmission of the program code and (ii) which is embedded in a carrier wave.

Each of the circuits (each block) included in the driving device 1 or 5 may be realized, by any of (i) software, (ii) hardware logic, and (iii) a combination of hardware which carries out part of a process and an operation means which executes software for carrying out control of the hardware and the rest of the process.

Although the above concretely describes the first embodiment and the second embodiment, the present invention is not limited thereto. An embodiment based on a proper combination of technical means disclosed in the two embodiments is encompassed in the technical scope of the present invention.

Further, a method for driving the pixel array section, including the step of generating a drive signal as described in the two embodiments, is also encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The driving device of the present embodiment is widely applicable to driving devices for driving pixel array sections.

REFERENCE SIGNS LIST

1 Driving device
2 Image display section
11 RGB separation section
12, 13, 14 Frame memory
15, 16, 17 Weighted average calculation section
18 Timing generation section
19 Color selection section
20 Pixel array section
21 Light source section (light source)

The invention claimed is:

1. A driving device for driving a pixel array section, comprising:

a generation device configured to generate pixel values of driving signals of at least one color for pixels of the at least one color among driving signals of a plurality of colors to be supplied sequentially to the pixel array section, the generation device being configured to generate the pixel values for each pixel of the at least one color on the basis of (i) a pixel value of the pixel in one of two continuously-inputted frames corresponding to the color of the pixel and (ii) a pixel value of the pixel in other one of the two continuously-inputted frames corresponding to the color of the pixel, wherein said generation device is configured to generate the pixel values of the drive signals of the at least one color for each pixel of the at least one color by obtaining a weighted average of (i) a value of the pixel in an $n^{th}$ input frame corresponding to the color of the pixel and (ii) a value of the pixel in an $(n-1)^{th}$ input frame corresponding to the color of the pixel, plural colors are generated by said generation means device on the basis of the $n^{th}$ input frame and the $(n-1)^{th}$ input frame, and weighing of the driving signals of the plural colors is carried out by using a greater weight for driving signals of one of the plural colors than a weight for drive signals of another one of the plural colors that are supplied to the pixel array section prior to the drive signals of the one of the plural colors.

2. The driving device as set forth in claim 1, wherein:

among the drive signals of the plurality of colors to be supplied sequentially to the pixel array section, said generation device being configured to generate drive signals of a specific color on the basis of an input video signal of an $n^{th}$ input frame which input video signal corresponds to the specific color; and said generation device being configured to generate drive signals of each of the rest of the plurality of colors other than the specific color on the basis of (i) an input video signal of the $n^{th}$ input frame which input video signal corresponds to the color and (ii) an input video signal of an $(n-1)^{th}$ input frame which input video signal corresponds to the color.

3. The driving device as set forth in claim 2, wherein the specific color has a highest display luminance among the plurality of colors.

4. The driving device as set forth in claim 2, wherein the specific color is green.

5. The driving device as set forth in claim 1 sequentially supplying, to the pixel array section, the drive signals of the plurality of colors by supplying driving signals of one color or by supplying drive signals of a combination of at least two colors, so as to cause the pixel array section to display p types of q number of subframes, the drive signals being generated on the basis of an $n^{th}$ input frame and an $(n-1)^{th}$ input frame or on the basis of the $n^{th}$ input frame, wherein q is not an integral multiple of p.

6. The driving device as set forth in claim 1, wherein a combination of drive signals of the plurality of colors are generated on the basis of an $n^{th}$ input frame and an $(n-1)^{th}$ input frame or on the basis of the $n^{th}$ input frame and are supplied in a combination thereof to the pixel array section, so that at least one of subframes displayed by the pixel array section is generated from the combination of drive signals of the plurality of colors.

7. The driving device as set forth in claim 1, further comprising:

a selection device, configured to select from the drive signals of the plurality of colors generated by said generation, drive signals of the plurality of colors to be supplied to the pixel array section in sync with a timing of lighting of light sources corresponding respectively to the color.

8. An image display device comprising: the driving device recited in claim 1; and the pixel array section which the image display device controls by use of the drive signals generated by said driving device.

9. The image display device as set forth in claim 8, wherein the pixel array section is a liquid crystal display panel having no color filter.

10. The image display device as set forth in claim 8, wherein the pixel array section has a color filter for allowing two color components to pass through.

11. A television receiver comprising an image display device recited in claim 8.

12. A display monitor device comprising an image display device recited in claim 8.

13. A method for driving a pixel array section, comprising:

generating pixel values of driving signals of at least one color for pixels of the at least one color among driving signals of a plurality of colors to be supplied sequentially to the pixel array section, the generating including the pixel values for each pixel of the at least one color on the basis of (i) a pixel value of the pixel in one of two continuously-inputted frames corresponding to the color of the pixel and (ii) a pixel value of the pixel in other one of the two continuously-inputted frames corresponding to the color of the pixel, wherein in said generating, the pixel values of the drive signals of the at least one color for each pixel of the at least one color are generated by obtaining a weighted average of (i) a value of the pixel in an $n^{th}$ input frame corresponding to the color of the pixel and (ii) a value of the pixel in an $(n-1)^{th}$ input frame corresponding to the color of the pixel, and in the generating, plural colors are generated by said generation means on the basis of the $n^{th}$ input frame and the $(n-1)^{th}$ input frame; and weighing of the driving signals of the plural colors is carried out by using a greater weight for driving signals of one of the plural colors than a weight for drive signals of another one of the plural colors that are supplied to the pixel array section prior to the drive signals of the one of the plural colors.

14. The method as set forth in claim 13, wherein:

in the generating, among the drive signals of the plurality of colors to be supplied sequentially to the pixel array section, drive signals of a specific color are generated on the basis of an input video signal of an $n^{th}$ input frame which input video signal corresponds to the specific color, whereas drive signals of each of the rest of the plurality of colors other than the specific color are generated on the basis of (i) an input video signal of the $n^{th}$ input frame which input video signal corresponds to the color and (ii) an input video signal of an $(n-1)^{th}$ input frame which input video signal corresponds to the color.

15. The method as set forth in claim 13, further comprising:

sequentially supplying, to the pixel array section the drive signals of the plurality of colors by supplying driving signals of one color or by supplying drive signals of a combination of at least two colors, so as to cause the pixel array section to display p types of q number of subframes, the drive signals being generated on the basis of an $n^{th}$ input frame and an $(n-1)^{th}$ input frame or on the basis of the $nt^{h}$ input frame, wherein q is not an integral multiple of p.

16. The method as set forth in claim 13, wherein a combination of drive signals of the plurality of colors are generated on the basis of an $n^{th}$ input frame and an $(n-1)^{th}$ input frame or on the basis of the $n^{th}$ input frame and are supplied in a combination thereof to the pixel array section, so that at least one of subframes displayed by the pixel array section is generated from the combination of drive signals of the plurality of colors.

17. The method as set forth in claim 13, further comprising:

selecting, from the drive signals of the plurality of colors generated by said generation, drive signals of the plurality of colors to be supplied to the pixel array section in sync with a timing of lighting of light sources corresponding respectively to the color.

18. A non-transitory computer-readable recording medium storing a program for causing a computer to operate as a driving device recited in claim 1, the program for causing a computer to serve as components of the driving device.

* * * * *